April 5, 1955          F. W. SUHR          2,705,770
HIGH POWER FACTOR SELF-STARTING INDUCTION MOTOR
Filed Oct. 29, 1954
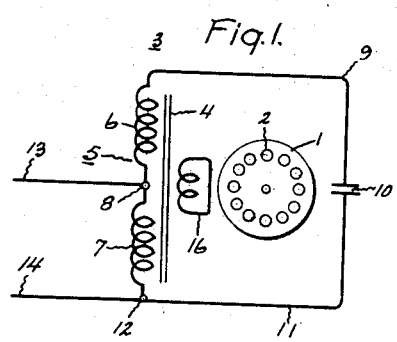
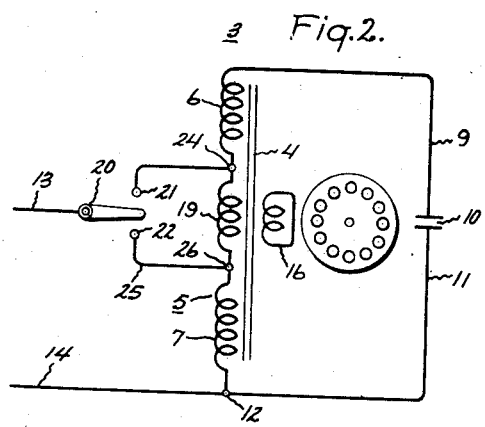
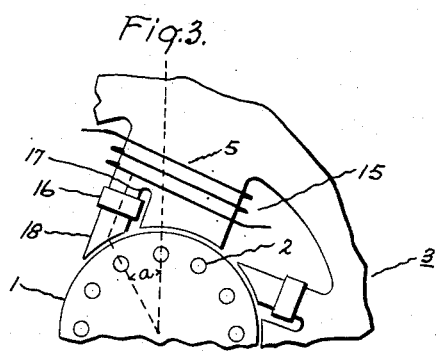
Inventor:
Fred W. Suhr,
by *(signature)*
His Attorney.

ary 5, 1955

United States Patent Office

2,705,770
Patented Apr. 5, 1955

2,705,770

HIGH POWER FACTOR SELF-STARTING INDUCTION MOTOR

Fred W. Suhr, Fort Wayne, Ind., assignor to General Electric Company, a corporation of New York Application October 29, 1954, Serial No. 465,614

3 Claims. (Cl. 318—200)

This invention relates to alternating-current electric motors, and more particularly to means for providing an economical, high power factor self-starting induction motor.

There are two prime features meriting consideration in the design of alternating-current electric motors. The first of these is economy in the manufacture of the motor without any substantial sacrifice of the performance of the motor; the second is the related feature of improvement in performance of the motor to as great an extent as possible without a corresponding rise in the cost of its manufacture. An important factor in the performance of electric motors which operate on alternating current is the power factor of the motor; the higher the power factor, the better the performance because a smaller current will effect the same amount of work. Another desirable feature relating to economy in the manufacture of the motor is to restrict the number of wound coils as much as possible so that the cost of the motor will be reduced to a minimum. When these advantages are present in a motor, it may be manufactured at an extremely low cost, yet the performance of the motor will be of a high order because a relatively low current will effect a relatively high amount of work.

It is, therefore, an object of this invention to provide an improved electric motor which will include the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspect, provides, in an induction motor, a stator having a single phase winding therein; this winding is made up of at least three serially connected coil sections which are mutually coupled to each other. A first coil section is adapted to be connected across a source of power. A second section is adapted to be selectively connected across the source with the first section so that the two form a primary coil, and so that the third section forms a secondary coil. When the first section alone is connected across the source, the second and third sections together form the secondary coil and the first section forms the primary coil. The different sections are connected so that the primary and secondary coils are in autotransformer relation with a capacitor connected across the sections. A shading coil is arranged on the stator so as to have a relatively weak coupling to the single phase winding so that the motor will start and run at a relatively high speed when the first section alone is connected acros sthe source, and will start and run at a relatively low speed when the second section is also selected to be connected across the source. The shading coil is arranged to receive a predetermined amount of flux from the coil sections and may be displaced therefrom a predetermined number of degrees, as is well known in the art, so as to effect starting of the motor.

In the drawing:

Figure 1 is a schematic illustration of an improved induction motor including the advantageous features of this invention;

Figure 2 is a schematic illustration of a second embodiment of the invention; and Figure 3 is a fragmentary view of a single pole of an improved stator of this invention illustrating the arrangement of the shading, or short circuited, coil.

Referring now to Figures 1 and 3 of the drawing, the first embodiment of this invention will be explained. There is provided in the motor a conventional squirrel cage rotor 1 having conductive members, such as 2, extending the length thereof, the conductive members being short circuited together at each end of the rotor (not shown). A stator 3 is provided, and it will be understood that rotor 1 is concentrically and rotatably mounted within stator 3 in the accepted well-known fashion, as is partly shown in Figure 3. Stator 3 has a core member schematically illustrated at 4. Core member 4 is preferably formed into poles 15 in the conventional manner, and a single phase winding, generally indicated at 5, is wound on the poles. Winding 5 is made up of a pair of coil sections 6 and 7; it will, of course, be understood that if it is so desired winding 5 may be formed as a single unit tapped at point 8, or it may be formed from two individual serially connected sections as shown in Figure 1. Sections 6 and 7 are preferably arranged on core 4 in coaxial relation, and, in any event, so as to be strongly mutually coupled. Section 6 is connected by a line 9 to a capacitor 10 which is connected by line 11 to end 12 of section 7. A pair of lines 13 and 14 are connected to points 8 and 12 respectively, as shown, and are adapted to be connected to a source of alternating current power.

A short circuited coil 16 is also provided in stator 3, and is so arranged with respect to coil 5 as to be coupled thereto relatively weakly compared to the coupling between the two sections 6 and 7 of coil 5. The arrangement of coil 16 is well known in the art and such coils are generally referred to as shading coils. As will be seen from Figure 3 each pole 15 may be provided with a slot 17, and a simple band of copper or some other conductive material may be inserted around leg 18 formed by the slot 17 so as to form the shading coil. It will be seen from Figure 3 that the center line of the axis of the shading coil 16 is displaced from the axis of coil 5 by a predetermined angle $a$. Angle $a$ may be selected, according to standards well-known in the electrical industry, whereby coil 16 will be coupled to coil 5 in an amount which will effectively cause the motor to start.

Coil sections 6 and 7 are connected in autotransformer relation, with coil 6 performing the function of the secondary and coil 7 being adapted to be connected across a source of power and performing the function of the primary. Thus, for example, if coil 7 is wound with 70 turns of wire and coil 6 is wound with 140 turns of wire, the combined voltage across capacitor 10 will be the sum of the coil section voltages, or about 3 times the line voltage across coil section 7. Many capacitors are designed for a minimum of approximately 235 volts for optimum operation. It is a well-known fact that, usually the line voltage is in the vicinity of 115 volts. When capacitors such as those mentioned are used across such a line they are only about 23% effective. It will be observed that increasing the applied voltage approximately 3 times brings the voltage across the capacitor well above the minimum required for optimum performance, and power factor correction.

It will be seen from the foregoing that this invention provides a motor whose running power is provided through the medium of a single phase winding, and that, in addition, the single phase winding performs two important additional functions: first, it is coupled to another short circuited coil in order to provide a starting torque for the motor and, second, it is arranged across the capacitor in such a way as to utilize the capacitor most effectively so as to improve the motor performance.

Referring now to Figure 2 of the drawing, there is shown a modification of the invention whereby the advantages of the invention may be incorporated into a two speed motor. In this embodiment, like parts will be referred to by the same numerals utilized in Figure 1. A principal different feature of Figure 2 is that winding 5 consists of a third section 19 in addition to sections 6 and 7. Also, line 13 leads to a switch arm 20 which is movable to two operative positions to contact alternatively either of terminals 21 and 22. Terminal 21 is secured to a line 23 which leads to a point 24 intermediate sections 6 and 19. Terminal 22 is connected to a line 25 which leads to a point 26 intermediate sections 19 and 7. When switch arm 20 is moved down to connect line 13 to terminal 22, coil section 7 will act as a primary and sections 19 and 6 will act as a secondary. On the other hand, when the switch arm 20 is moved up to connect line 13 to terminal 21, sections 19 and 7 will act as a primary and section 6 will act as a secondary.

In the first instance, section 7 alone is connected across the lines 13 and 14 in operative relation with the rotor 1 and the motor will run at a relatively high speed; however, when switch arm 20 is moved up so that lines 13 and 14 are connected across sections 19 and 7 in series, there will be greater number of coil turns connected across the line in operative relation with the rotor 1 and the motor will run at a second lower speed. At the high speed excellent power factor correction will be obtained because the voltage across capacitor 10 will be the result of connecting sections 7, 19, and 6 together in autotransformer relation where section 7 is the primary coil and sections 6 and 19 added together constitute the secondary coil. At the lower speed, sections 19 and 7 together constitute the primary coil and section 6 acts as the secondary coil. It will be observed that an autotransformer action is obtained at both running speeds. At the high speed, the power factor correction may be made almost perfect, as described before, by proper calculation of the ratio of the number of turns in the secondary coil (made up of sections 6 and 19) to the number of turns in the primary coil (made up of section 7), and proper selection of the capacitor.

It will be clear that the invention may be practiced with motors having any even number of poles. It will further be clear that the winding section usable as an autotransformer primary coil may be placed on all poles of the motor, or only on a portion thereof; by the same token, the winding section usable as an autotransformer secondary coil may be placed on all poles of the motor, or may be placed on only a portion thereof which will generally consist of those poles not occupied by the primary coil winding section; all such arrangements are obviously within the present invention which is concerned primarily with the relationship of the winding sections to each other, to the capacitor, and to the shading coil, and not with the internal arrangement of either of the winding sections individually.

It will be seen from the foregoing that this invention provides a multi-speed induction motor having a stator provided with a single sectioned phase winding which cooperates with a short circuited winding and a capacitor and is so connected that by means of an extremely economical construction the motor is properly started and efficiently run.

While this invention has been explained by describing particular embodiments thereof it will be apparent that improvements and modifications may be made without departing from the scope of the invention as defined in the appended claims.

What I claim as new and desire to secure by Letters Patent of the United States is:

1. In an induction motor, a stator comprising a single phase winding including three serially connected coil sections mutually coupled to each other, one of said sections being adapted to be connected across a source of power, a second of said sections being adapted to be selectively connected across said source with said one section, said one section and said second section forming a primary coil and the third section forming a secondary coil when said second section is selected to be connected across said source, said second section and said third section forming a secondary coil and said one section forming a primary coil when said one section alone is selected to be connected across said source, said sections being connected so that the primary coil and the secondary coil are in autotransformer relation, a capacitor connected across said coil sections, and a shading coil arranged on said stator so as to have a relatively weak coupling to said single phase winding whereby said motor starts and runs at a relatively high speed when said one section alone is selected to be connected across the source and starts and runs at a relatively low speed when said second section is also selected to be connected across said source.

2. In an induction motor, a stator comprising a single phase winding including three serially connected coaxially wound coil sections mutually coupled to each other, switch means movable to two operative positions and arranged thereby selectively to connect one of said sections across a source of alternating current power in one of said operative positions and to connect said one section and a second section across the source in the other of said operative positions, said one section and said second section forming a primary coil and the third section forming a secondary coil in the second position of said switch, said second section and said third section forming a secondary coil and said one section forming a primary coil in the first position of said switch, said sections being connected so that the primary coil and the secondary coil are in autotransformer relation, a capacitor connected across said coil sections, and a shading coil angularly displaced from said single phase winding and having a relatively weak coupling thereto whereby said motor starts and runs at a relatively high speed when said one section is connected across the source and starts and runs at a relatively low speed when said one section and said second section are connected across the source.

3. In an induction motor, a stator comprising a single phase winding including a plurality of serially connected coil sections mutually coupled to each other, switch means movable to a plurality of operative positions, said switch means being arranged to select a predetermined number of said sections to be connected across a source of alternating current power in each of said operative positions, said selected sections forming a primary coil and the remainder of said sections forming a secondary coil in each of the operative positions of said switch, said sections being connected so that the primary coil and the secondary coil are in autotransformer relation, a capacitor connected across said coil sections, and a shading coil angularly displaced from said single phase winding and having a relatively weak coupling thereto whereby said motor starts and runs at a predetermined speed for each selected operative position of said switch.

References Cited in the file of this patent

UNITED STATES PATENTS

| Number | Name | Date |
|---|---|---|
| 771,293 | Averrett | Oct. 4, 1904 |
| 1,239,979 | Steinmetz | Sept. 11, 1917 |
| 1,715,866 | Rother | June 4, 1929 |
| 1,858,255 | Weichsel | May 17, 1932 |
| 2,002,382 | Wilson | May 21, 1935 |
| 2,073,532 | Ballman | Mar. 9, 1937 |
| 2,262,376 | Veinott | Nov. 11, 1941 |
| 2,266,088 | Shea | Dec. 16, 1941 |
| 2,570,894 | Willsey | Oct. 9, 1951 |